United States Patent Office.

MORITZ SCHNEIDER, OF CLEVELAND, OHIO.

Letters Patent No. 66,257, dated July 2, 1867.

---

IMPROVED PAINT COMPOUND.

---

The Schedule referred to in these Letters Patent and making part of the same.

---

TO ALL WHOM IT MAY CONCERN:

Be it known that I, MORITZ SCHNEIDER, of Cleveland, in the county of Cuyahoga, and State of Ohio, have invented new and useful improvements in a Paint Compound; and I do hereby declare that the following is a full and complete description of the same, of the ingredients used, and the manner of compounding them.

I take three pounds of resin and boil it in half a gallon of benzine. This is done by placing the resin and benzine in a vessel of convenient size and form, and surrounding it with steam at a high degree of heat until all the resin is dissolved. This boiling drives off the water from the resin and benzine, which would otherwise remain if the resin was dissolved cold, and thus affect the drying qualities of the paint, and at the same time would not afford so good a protection to the painted wood or other articles to which it may be applied. After the resin and benzine are thus prepared I add to them two and a half pounds of China clay, or of lime, two and a half pounds of dry zinc pigment, and one pound of linseed oil. This makes a white paint or varnish, to which may be added any desired coloring matter or pigment. This paint may be rendered more firm and durable by combining a quarter of a pound of litharge with the pound of linseed oil used as above named. This compound is especially designed for painting oil-barrels, as it so combines and adheres to the wood as to render it impervious to oil, and consequent waste by absorption or leakage, as the paint thoroughly fills the pores of the wood and renders it firm and solid. This paint will dry in about four hours after it has been spread, while the ordinary paint in use takes from twenty to thirty-six hours. This paint may be applied to all the purposes of ordinary paint.

What I claim as my improvement, and desire to secure by Letters Patent, is—

A paint composed of the ingredients herein named, when compounded in the manner substantially as herein set forth.

his
MORITZ × SCHNEIDER.
mark.

Witnesses:
   W. H. BURRIDGE,
   GEO. ARNOLD.